(12) United States Patent
Maeda et al.

(10) Patent No.: US 9,878,541 B2
(45) Date of Patent: Jan. 30, 2018

(54) WATER-BASED INK SET FOR INK-JET RECORDING AND INK-JET RECORDING APPARATUS (71) Applicant: Brother Kogyo Kabushiki Kaisha, Nagoya-shi, Aichi-ken (JP)

(72) Inventors: Mitsunori Maeda, Nagoya (JP); Yuki Okumura, Ichiomiya (JP); Hiroyuki Tanaka, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/276,852

(22) Filed: Sep. 27, 2016

(65) Prior Publication Data
US 2017/0182779 A1    Jun. 29, 2017

(30) Foreign Application Priority Data

Dec. 25, 2015 (JP) ................. 2015-254140

(51) Int. Cl.
C09D 11/40     (2014.01)
B41J 2/165     (2006.01)
B41J 2/21      (2006.01)
C09D 11/033    (2014.01)
C09D 11/107    (2014.01)
(Continued)

(52) U.S. Cl.
CPC ......... *B41J 2/16505* (2013.01); *B41J 2/1652* (2013.01); *B41J 2/16508* (2013.01); *B41J 2/16523* (2013.01); *B41J 2/16526* (2013.01); *B41J 2/21* (2013.01); *C09D 11/033* (2013.01); *C09D 11/107* (2013.01); *C09D 11/322* (2013.01); *C09D 11/324* (2013.01); *C09D 11/40* (2013.01)

(58) Field of Classification Search
CPC ........ B41J 2/16526; B41J 2/1652; B41J 2/21; B41J 2/16523; C09D 11/40; C09D 11/322; C09D 11/033
See application file for complete search history.

(56) References Cited

U.S. PATENT DOCUMENTS 5,609,671 A    3/1997  Nagasawa
5,837,045 A    11/1998 Johnson et al.
(Continued)

FOREIGN PATENT DOCUMENTS

JP    H08-003498 A    1/1996
JP    2000-513396 A   10/2000
(Continued)

*Primary Examiner* — Sharon A Polk
(74) *Attorney, Agent, or Firm* — Banner & Witcoff, Ltd.

(57) ABSTRACT

There is provided a water-based ink set for ink-jet recording, including: a water-based black ink containing a self-dispersible pigment, a water-soluble organic solvent of which vapor pressure is less than 1 Pa, and water; water-based color inks of two or more colors each containing a color pigment, a resin dispersant, a water-soluble organic solvent of which vapor pressure is less than 1 Pa, and water, wherein an average value of blending amounts of the water-soluble organic solvents in all of the water-based inks constituting the water-based ink set is in a range of 15% by weight to 35% by weight, and the water-based ink set satisfies the following condition X and condition Y,
condition X: C−K≥0.6
condition Y: A≤1.5.

13 Claims, 3 Drawing Sheets (51) Int. Cl.
*C09D 11/322* (2014.01)
*C09D 11/324* (2014.01)

(56) References Cited

U.S. PATENT DOCUMENTS

| | | |
|---|---|---|
| 7,819,962 B2 | 10/2010 | Gu |
| 7,922,805 B2 | 4/2011 | Kowalski et al. |
| 8,858,695 B2 | 10/2014 | Gu et al. |
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2009/0229489 A1 | 9/2009 | Gu |
| 2012/0328853 A1 | 12/2012 | Matsuyama et al. |
| 2013/0002754 A1 | 1/2013 | Aruga et al. |
| 2016/0075880 A1 | 3/2016 | Gu et al. |
| 2017/0037268 A1* | 2/2017 | Wakabayashi ....... C09D 11/322 |

FOREIGN PATENT DOCUMENTS

| | | |
|---|---|---|
| JP | 2006-206725 A | 8/2006 |
| JP | 2006-241324 A | 9/2006 |
| JP | 2008-524400 A | 7/2008 |
| JP | 2009-515007 A | 4/2009 |
| JP | 2010-064411 A | 3/2010 |
| JP | 2011-515535 A | 5/2011 |
| JP | 2011-202152 A | 10/2011 |
| JP | 2013-010197 A | 1/2013 |

* cited by examiner

WATER-BASED INK SET FOR INK-JET RECORDING AND INK-JET RECORDING APPARATUS

CROSS REFERENCE TO RELATED APPLICATION

The present application claims priority from Japanese Patent Application No. 2015-254140 filed on Dec. 25, 2015, the disclosure of which is incorporated herein by reference in its entirety.

BACKGROUND

Field of the Invention

The present invention relates to a water-based ink set for ink-jet recording and an ink-jet recording apparatus.

Description of the Related Art

Ink-jet recording is conventionally performed by jetting a water-based black ink and water-based color inks from an ink-jet head to record a black recording portion and color recording portions. Such ink-jet recording may cause bleeding at a boundary between the black recording portion and each color recording portion, and the blurred black ink deteriorates recording quality. The ink-jet recording may use a water-based pigment ink containing a pigment as colorant. Since the pigment is insoluble in water, jetting stability is strongly required for the ink-jet recording using a water-based ink set including the water-based pigment ink. To prevent the bleeding and enhance the jetting stability, there is proposed a water-based ink set for ink-jet recording in which the content of a water-soluble solvent in each of the water-based black pigment ink and the water-based color inks is regulated. Regarding ink-jet recording apparatuses, they typically include a maintenance unit with a wipe member and the like which wipes the water-based ink adhering to an ink jetting surface of an ink-jet head.

If water-based pigment inks of multiple colors constituting a water-based ink set for ink-jet recording are brought into contact with each other, for example, on the ink jetting surface of the ink-jet head, their pigments may aggregate or coagulate to generate their aggregations or coagulation. If the aggregations, which are generated by mixing the water-based pigment inks with each other, are present in great quantity, for example, wiping or collecting of the aggregations becomes difficult when the maintenance using the maintenance unit is performed. This problem deteriorates maintenability. Thus, it is desired to develop a novel water-based ink set for ink-jet recording which is less likely to cause the bleeding at a boundary between a black recording portion and each color recording portion and to generate a pigment aggregation when the water-based pigment inks are mixed with each other in the ink-jet recording apparatus.

In view of the above, an object of the present teaching is to provide a water-based ink set for ink-jet recording which is less likely to cause the bleeding at a boundary between a black recording portion and each color recording portion and to generate an aggregation or coagulation during maintenance.

SUMMARY

According to an aspect of the present teaching, there is provided a water-based ink set for ink-jet recording, including:

a water-based black ink containing a self-dispersible pigment, a water-soluble organic solvent of which vapor pressure is less than 1 Pa, and water;

water-based color inks of two or more colors each containing a color pigment, a resin dispersant, a water-soluble organic solvent of which vapor pressure is less than 1 Pa, and water;

wherein an average value of blending amounts of the water-soluble organic solvents in the water-based black ink and the water-based color inks of two or more colors constituting the water-based ink set is in a range of 15% by weight to 35% by weight, and the water-based ink set satisfies the following condition X and condition Y, condition X: $C-K \geq 0.6$ C: an average value (mS/m) of a total of a highest electric conductivity of the water-based color inks of two or more colors, if the water-based color inks of two or more colors each have the highest electric conductivity, or an average value (mS/m) of a highest electric conductivity and a second highest electric conductivity of the water-based color inks of two or more colors, if the water-based color inks of two or more colors have the single highest electric conductivity K: an electric conductivity (mS/m) of the water-based black ink condition Y: $A \leq 1.5$ A: an electric conductivity (mS/m) of a water-based ink prepared by mixing all of the water-based black ink and the water-based color inks of two or more colors constituting the water-based ink set in equal amount.

The water-based ink set for ink-jet recording of the present teaching determines the total blending amount of the water-soluble organic solvents, which have low vapor pressure and are less likely to generate an aggregation or coagulation, in the entire water-based ink set and the relation between the electric conductivity of the water-based black ink containing the self-dispersible pigment and the electric conductivity of the water-based color inks each containing a color pigment and the resin dispersant. Thus, the water-based ink set for ink-jet recording of the present teaching is less likely to cause the bleeding at a boundary between a black recording portion and each color recording portion and to generate an aggregation or coagulation during maintenance.

DESCRIPTION OF THE EMBODIMENTS

An explanation will be made about a water-based ink set for ink-jet recording of the present teaching (hereinafter also referred to as "water-based ink set" or "ink set" in some cases). The water-based ink set for ink-jet recording of the present teaching includes a water-based black ink and water-based color inks of two or more colors (hereinafter the water-based black ink and the water-based color inks constituting the water-based ink set for ink-jet recording will be also referred to as "water-based ink(s)" or "ink(s)" in some cases).

The water-based black ink contains a self-dispersible pigment, a water-soluble organic solvent of which vapor pressure is less than 1 Pa, and water.

Those usable as the self-dispersible pigment include self-dispersible pigments subjected to the surface treatment by any one of methods described, for example, in Japanese Patent Application Laid-open No. HEIS-3498 (corresponding to U.S. Pat. No. 5,609,671 A), Published Japanese Translation of PCT International Publication for Patent Application No. 2000-513396 (corresponding to U.S. Pat. No. 5,837,045 A), Published Japanese Translation of PCT International Publication for Patent Application No. 2008-524400 (corresponding to United States Patent Application Publication No. US 2006/0201380 A1), Published Japanese Translation of PCT International Publication for Patent Application No. 2009-515007 (corresponding to United States Patent Application Publications No. US 2007/0100023 A1 and No. US 2007/0100024 A1), and Published Japanese Translation of PCT International Publication for Patent Application No. 2011-515535 (corresponding to United States Patent Application Publication No. US 2009/0229489 A1). Examples of the pigment suitable for the above-described treatment include "MA8", "MA100", and "#2650" produced by Mitsubishi Chemical Corporation. A commercially available product may be used as the self-dispersible pigment. Examples of the commercially available product include "CAB-O-JET (trade name) 200", "CAB-O-JET (trade name) 300", and "CAB-O-JET (trade name) 400" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd. The self-dispersible pigment may be self-dispersible carbon black.

The blending amount of the self-dispersible pigment (self-dispersible pigment solid content amount) in the entire amount of the water-based black ink is not particularly limited, and may be appropriately determined based on desired optical density, or the like. The self-dispersible pigment solid content amount is, for example, in the range of 0.1% by weight to 20% by weight, 1% by weight to 15% by weight, 2% by weight to 10% by weight, or 5% by weight to 9% by weight.

The water-based black ink may contain, for example, another pigment and a dye, in addition to the self-dispersible pigment.

The water-soluble organic solvent of which vapor pressure is less than 1 Pa (hereinafter referred to as "low vapor pressure solvent" in some cases) is exemplified, for example, by glycerol, polyethylene glycol 200, triethylene glycol, tripropylene glycol, trimethylol propane, and 1,6-hexanediol. The value of the vapor pressure is measured, for example, at a temperature of 20° C.

The average value of the blending amounts of the low vapor pressure solvents in all of the water-based inks constituting the water-based ink set of the present teaching is in the range of 15% by weight to 35% by weight. This prevents, for example, the increase in viscosity of the water-based ink. Thus, the blending amount of the low vapor pressure solvent in the entire amount of the water-based black ink is regulated as appropriate while balancing itself with the blending amount of the low vapor pressure solvent in each of the remaining water-based inks constituting the water-based ink set of the present teaching. The blending amount of the low vapor pressure solvent in the entire amount of the water-based black ink is, for example, in the range of 10% by weight to 40% by weight, 15% by weight to 30% by weight, or 20% by weight to 25% by weight. The average value of the blending amounts of the low vapor pressure solvents in all of the water-based inks constituting the water-based ink set of the present teaching is, for example, in the range of 20% by weight to 30% by weight.

The water-based black ink may contain any other water-soluble organic solvent than the low vapor pressure solvent. Examples of the water-soluble organic solvent other than the low vapor pressure solvent include a humectant which prevents the water-based black ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as diethylene glycol and 1,2-hexanediol; 2-pyrrolidone; N-methyl-2-pyrrolidone; and 1,3-dimethyl-2-imidazolidinone. Only one kind of the humectant as described above may be used singly, or two or more kinds of the humectants may be used in combination.

The blending amount of the humectant in the entire amount of the water-based black ink is, for example, in the range of 0% by weight to 95% by weight, 5% by weight to 80% by weight, or 5% by weight to 50% by weight.

The penetrant includes, for example, glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination.

The blending amount of the penetrant in the entire amount of the water-based black ink is, for example, in the range of 0% by weight to 20% by weight, 0% by weight to 15% by weight, or 1% by weight to 4% by weight.

The water may be ion-exchanged water or pure water (purified water). The blending amount of the water in the entire amount of the water-based black ink may be, for example, a balance of the other components.

The water-based black ink may further contain a surfactant. The surfactant is not particularly limited, and it may be an anionic surfactant, a nonionic surfactant, or a cationic surfactant. Examples of the anionic surfactant include "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, and "LOTAT (trade name) series produced by LION SPECIALITY CHEMICALS CO., LTD.; "EMAL (trade name)" series, "LATEMUL (trade name)" series, "VENOL (trade name)" series, "NEOPELEX (trade name)" series, NS SOAP, KS SOAP, OS SOAP, and "PELEX (trade name) series produced by Kao Corporation; "SANDET (trade name)" series and "BEAULIGHT (trade name)" series produced by Sanyo Chemical Industries, Ltd.; "ALSCOPE (trade name)" series, "NEOSCOPE (trade name)" series, and "PHOSPHANOL (trade name)" series produced by TOHO Chemical Industry Co., Ltd.; and sodium hexadecyl sulfate and sodium stearyl sulfate produced by TOKYO CHEMICAL INDUSTRY CO., LTD. Examples of the nonionic surfactant include "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, and "LEOFAT (trade name)" series produced by LION SPECIALITY CHEMICALS CO., LTD.; "EMULGEN (trade name)" series, "RHEODOL (trade name)" series, "EMASOL (trade name)" series, "EXCEL (trade name)" series, "EMANON (trade name)" series, "AMIET (trade name)" series, and "AMINON (trade name)" series produced by KAO Corporation; "OLFIN (trade name)" series produced by Nissin Chemical Industry Co., Ltd. The cationic surfactant is exemplified, for example, by "KACHIOGEN (trade name)" series produced by Dai-Ichi Kogyo Seiyaku Co., Ltd. Only one kind of the surfactant as described above may be used singly, or two or more kinds of the surfactants may be used in combination.

The surfactant may include an acetylenic glycol-based surfactant. The acetylenic glycol-based surfactant is exemplified, for example, by a compound represented by the formula (1):

In the formula (1), p and q may be identical to each other or different from each other. For example, p and q are integers satisfying p+q=1 to 15, 3 to 11, or 4 to 10. In the formula (1), $R^1$, $R^2$, $R^3$, and $R^4$ may be identical to each other or different from each other, and each of $R^1$, $R^2$, $R^3$, and $R^4$ is a straight or branched chain alkyl group having 1 to 5 carbon atoms.

A commercially available product may be used as the acetylenic glycol-based surfactant. Examples of the commercially available product include "OLFIN (trade name) E1004", "OLFIN (trade name) E1008", and "OLFIN (trade name) E1010" produced by Nissin Chemical Industry Co., Ltd.

The blending amount of the surfactant in the entire amount of the water-based black ink is, for example, in the range of 0% by weight to 10% by weight, 0.01% by weight to 5% by weight, or 0.1% by weight to 1% by weight.

The water-based black ink may further contain at least one of a water-soluble resin and a water-dispersible resin (hereinafter referred to as "resin" in some cases). Examples of the resin include acrylic resin, styrene acrylic resin, urethane resin, polyvinyl alcohol resin, sodium polyacrylate, acrylic acid-maleic acid copolymer salt, styrene-maleic anhydride copolymer resin, vinyl acetate resin, vinyl acetate-acrylate copolymer resin, and vinyl acetate-ethylene copolymer resin. The resin may be prepared privately or independently, or a commercially available product may be used for the resin. Examples of the commercially available product include "JOHNCRYL (trade name) 537" (acrylic resin), "JOHNCRYL (trade name) 60" (acrylic resin), "JOHNCRYL (trade name) 450" (styrene acrylic resin), "JOHNCRYL (trade name) 390" (acrylic resin), "JOHNCRYL (trade name) 62" (styrene acrylic resin), and "JOHNCRYL (trade name) HPD-96" (styrene acrylic resin) produced by BASF Corporation; "F-52" (acrylic resin), "KE-1148" (acrylic resin), and "PE-1304" (styrene acrylic resin) produced by SEIKO PMC CORPORATION; "SUPERFLEX 210" (urethane resin) and "SUPERFLEX E-4000" (urethane resin, active ingredient amount=45% by weight) produced by DAI-ICHI KOGYO SEIYAKU CO., LTD.; "UCOAT (trade name) UWS-145" (urethane resin), "PERMARIN (trade name) UA-150" (urethane resin), and "PERMARIN (trade name) UA-368" (urethane resin) produced by Sanyo Chemical Industries, Ltd.; "PVA-220" (10% aqueous solution of polyvinyl alcohol resin) and "PVA-203" (10% aqueous solution of polyvinyl alcohol resin) produced by KURARAY CO., LTD.; and "AQUALIC (trade name) L DL-40" (sodium polyacrylate, active ingredient amount=40% by weight) and "AQUALIC (trade name) L TL-37" (acrylic acid-maleic acid copolymer salt, active ingredient amount=37% by weight) produced by NIPPON SHOKUBAI CO., LTD. Of the above, the resin which contains at least one of methacrylic acid and acrylic acid as a monomer may be used. Although the acid value of the resin is not particularly limited, it is, for example, in the range of 90 mgKOH/g to 200 mgKOH/g, 100 mgKOH/g to 200 mgKOH/g, or 100 mgKOH/g to 150 mgKOH/g.

Only one kind of the resin may be used singly, or two or more kinds of the resins may be used in combination. The solid content blending amount of the resin in the entire amount of the water-based black ink is, for example, in the range of 0% by weight to 10% by weight, 0.01% by weight to 5% by weight, or 0.1% by weight to 1% by weight.

The water-based black ink may further contain a conventionally known additive, as necessary. Examples of the additive include pH-adjusting agents, viscosity-adjusting agents, surface tension-adjusting agents, and fungicides. The viscosity-adjusting agents include, for example, cellulose. The water-soluble resin may also function as the viscosity-adjusting agent.

The water-based black ink can be prepared, for example, such that the self-dispersible pigment, the low vapor pressure solvent, water, and optionally other additive component(s) are mixed uniformly or homogeneously by any conventionally known method, and undissolved matters are removed by a filter or the like.

Regarding the water-based color inks of two or more colors constituting the water-based ink set of the present teaching, they may include inks of at least three primary colors (a water-based yellow ink, a water-based magenta ink, and a water-based cyan ink). The water-based color inks of two or more colors each contain a color pigment, a resin dispersant, the low vapor pressure solvent, and water.

Examples of the color pigment include C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

The blending amount of the color pigment (color pigment solid content amount) in the entire amount of each of the water-based color inks is not particularly limited, and may be appropriately determined based on desired color (hue, tint), or the like. The color pigment solid content amount is, for example, in the range of 0.1% by weight to 20% by weight, 1% by weight to 15% by weight, or 2% by weight to 10% by weight. When the water-based color inks include the water-based yellow ink, the water-based magenta ink, and the water-based cyan ink, the color pigment solid content amount of the water-based yellow ink is in the range of 3.5% by weight to 6% by weight, the color pigment solid content amount of the water-based magenta ink is in the range of 4% by weight to 6.5% by weight, and the color pigment solid content amount of the water-based cyan ink is in the range of 2.5% by weight to 4.5% by weight.

Each of the water-based color inks may contain, for example, a dye, in addition to the color pigment.

As the resin dispersant, for example, a general polymeric dispersant may be used, and the general polymeric dispersant may be a commercially available product. Examples of the commercially available product include "JOHNCRYL (trade name) 611", "JOHNCRYL (trade name) 60", "JOHNCRYL (trade name) 586", "JOHNCRYL (trade name) 687", "JOHNCRYL (trade name) 63", and "JOHNCRYL (trade name) HPD296" produced by BASF Corporation; "Disperbyk 190" and "Disperbyk 191" produced by BYK additives & Instruments; and "SOLSPERSE 20000" and "SOLSPERSE 27000" produced by Zeneca. The resin dispersant may contain at least one of the methacrylic acid and the acrylic acid as a monomer.

The same low vapor pressure solvent as the water-based black ink is used for the water-based color inks. The blending amount of the low vapor pressure solvent in the entire amount of each of the water-based color inks is regulated, as appropriate, similarly to the water-based black ink, while balancing itself with the blending amount of the low vapor pressure solvent in each of the remaining water-based inks constituting the water-based ink set of the present teaching. The blending amount of the low vapor pressure solvent in the entire amount of each of the water-based color inks is, for example, in the range of 10% by weight to 40% by weight, 15% by weight to 35% by weight, or 20% by weight to 30% by weight.

Similar to the water-based black ink, each of the water-based color inks may contain any other water-soluble organic solvent than the low vapor pressure solvent.

The water may be ion-exchanged water or pure water (purified water). The blending amount of the water in the entire amount of each of the water-based color inks may be, for example, a balance of the other components.

Similar to the water-based black ink, each of the water-based color inks may contain at least one of the above-listed surfactants. The surfactant may be the acetylenic glycol-based surfactant. The blending amount of the acetylenic glycol-based surfactant in the entire amount of each of the water-based color inks may be identical to or greater than the blending amount of the acetylenic glycol-based surfactant in the entire amount of the water-based black ink. When the water-based color inks include the water-based yellow ink, the water-based magenta ink, and the water-based cyan ink, the blending amount of the acetylenic glycol-based surfactant in the entire amount of the water-based yellow ink may be greater than the blending amount of the acetylenic glycol-based surfactant in the entire amount of each of the water-based magenta ink and the water-based cyan ink.

Similar to the water-based black ink, each of the water-based color inks may contain at least one of the above-listed resins and at least one of the above-listed additives. The resin(s) in each of the water-based color inks may also function as the resin dispersant.

Each of the water-based color inks can be prepared, for example, such that a color pigment, the resin dispersant, the low vapor pressure solvent, water, and optionally other additive component(s) are mixed uniformly or homogeneously by any conventionally known method, and undissolved matters are removed by a filter or the like.

The water-based ink of the present teaching is less likely to cause the bleeding at a boundary between a black recording portion and each color recording portion and to generate an aggregation or coagulation during maintenance. The mechanisms obtaining the above advantages are assumed, for example, as follows. Namely, when the pigment aggregates on a recording medium, the pigment aggregation prevents the bleeding. However, when the pigment aggregates in the vicinity of nozzles of an ink-jet head and/or in channels of a maintenance unit, the pigment aggregation will cause a trouble in the ink-jet recording apparatus. When the water-based black ink containing the self-dispersible pigment has high ion concentration (high electric conductivity), the electrical repulsion of the self-dispersible pigment is lost. This makes dispersion of the pigment unstable, thereby generating the aggregation. Meanwhile, since each of the water-based color inks containing a color pigment and the resin dispersant undergoes steric hindrance of the resin dispersant to disperse the color pigment, the water-based color inks are less likely to have high ion concentration and unstable dispersion. When the water-based black ink containing the self-dispersible pigment makes contact with each of the water-based color inks having high electric conductivity, the self-dispersible pigment aggregates. The aggregation of the pigment is more likely to occur as the amounts of the water-soluble organic solvent(s) contained in the water-based black ink and the water-based color inks are smaller. Since the low vapor pressure solvent evaporates quickly, mixing the low vapor pressure solvent with the water-based ink helps the pigment aggregate. If the water-based ink contains the low vapor pressure solvent excessively, the low vapor pressure solvent having high viscosity increases the viscosity of the water-based ink after evaporation, leading to the trouble in maintenance. To deal with these problems, the water-based ink set of the present teaching defines the total blending amount of the low vapor pressure solvents in the entire water-based ink set and the relation in electric conductivity between the water-based black ink containing the self-dispersible pigment and each water-based color ink containing a color pigment and the resin dispersant. Thus, the pigment of the water-based ink set of the present teaching aggregates on the recording medium to the extent that the bleeding is prevented, and even if the water-based black ink makes contact with each of the water-based color inks in the ink-jet recording apparatus (especially, in the maintenance unit), the pigment does not aggregate in large quantity. The above mechanisms, however, are just assumptions and the present teaching is not limited thereto.

The water-based ink set of the present teaching satisfies the following condition X and condition Y, condition X: C−K≥0.6

C: an average value (mS/m) of a total of a highest electric conductivity of the water-based color inks, if the water-based color inks each have the highest electric conductivity, or an average value (mS/m) of a highest electric conductivity and a second highest electric conductivity of the water-based color inks if the water-based color inks have the single highest electric conductivity K: an electric conductivity (mS/m) of the water-based black ink condition Y: A≤1.5

A: an electric conductivity (mS/m) of a water-based ink prepared by mixing all of the water-based inks constituting the water-based ink set in equal amount. The electric conductivity in the condition X and the condition Y can be measured, for example, by an electric conductivity meter "F-54" produced by HORIBA, Ltd.

The electric conductivity of the water-based black ink is, for example, in the range of 0.2 mS/m to 2 mS/m, 0.4 mS/m to 1.1 mS/m, or 0.6 mS/m to 0.9 mS/m. When the water-based color inks include the water-based yellow ink, the water-based magenta ink, and the water-based cyan ink, the electric conductivity of the water-based yellow ink is, for example, in the range of 0.3 mS/m to 2 mS/m, 0.5 mS/m to 1.5 mS/m, or 0.8 mS/m to 1.3 mS/m. The electric conductivity of the water-based magenta ink is, for example, in the range of 0.5 mS/m to 3.5 mS/m, 1 mS/m to 3 mS/m, or 1.3 mS/m to 2.5 mS/m. The electric conductivity of the water-based cyan ink is, for example, in the range of 0.3 mS/m to 1.3 mS/m, 0.5 mS/m to 1.5 mS/m, or 0.8 mS/m to 1.3 mS/m.

The electric conductivity of each of the inks can be regulated by regulating the ion concentration in each of the inks. The regulation of the ion concentration is performed by regulating the blending amounts of the self-dispersible pigment or each color pigment, the resin, the anionic surfactant, and the pH-adjusting agent. Although the magnitude relation between the electric conductivity of the respective inks is not particularly limited, the water-based magenta ink may have the highest electric conductivity and the water-based black ink may have the lowest electric conductivity. For example, the magnitude relation between the electric conductivity of the respective inks may be as follows: the electric conductivity of the water-based magenta ink>the electric conductivity of the water-based yellow ink>the electric conductivity of the water-based cyan ink>the electric conductivity of the water-based black ink; or the electric conductivity of the water-based magenta ink>the electric conductivity of the water-based cyan ink>the electric conductivity of the water-based yellow ink>the electric conductivity of the water-based black ink. The difference between the electric conductivity of the water-based magenta ink and the electric conductivity of the water-based black ink may be not less than 0.8 mS/m.

The water-based ink set of the present teaching may satisfy the following condition X1 and condition Y1 or condition Y2, condition X1: C−K≥0.7

C: an average value (mS/m) of a highest electric conductivity and a second highest electric conductivity of the water-based color inks if the water-based color inks have the single highest electric conductivity, or an average value (mS/m) of a total of a highest electric conductivity of the water-based color inks, if the water-based color inks each have the highest electric conductivity K: an electric conductivity (mS/m) of the water-based black ink condition Y1: A≤1.35 condition Y2: A≤1.2

A: an electric conductivity (mS/m) of a water-based ink prepared by mixing all of the water-based inks constituting the water-based ink set in equal amount.

Next, an explanation will be made about an ink-jet recording apparatus of the present teaching.

The ink-jet recording apparatus of the present teaching is an ink-jet recording apparatus characterized by including: ink accommodating sections; an ink-jet head including nozzle rows from which inks, which are contained in the ink accommodating sections respectively, are jetted; and a maintenance unit allowing the inks to be discharged from the nozzles of the ink-jet head, wherein the inks contained in the ink accommodating sections respectively are the water-based black ink and the water-based color inks of two or more colors constituting the water-based ink set for ink-jet recording of the present teaching.

Figure 1:
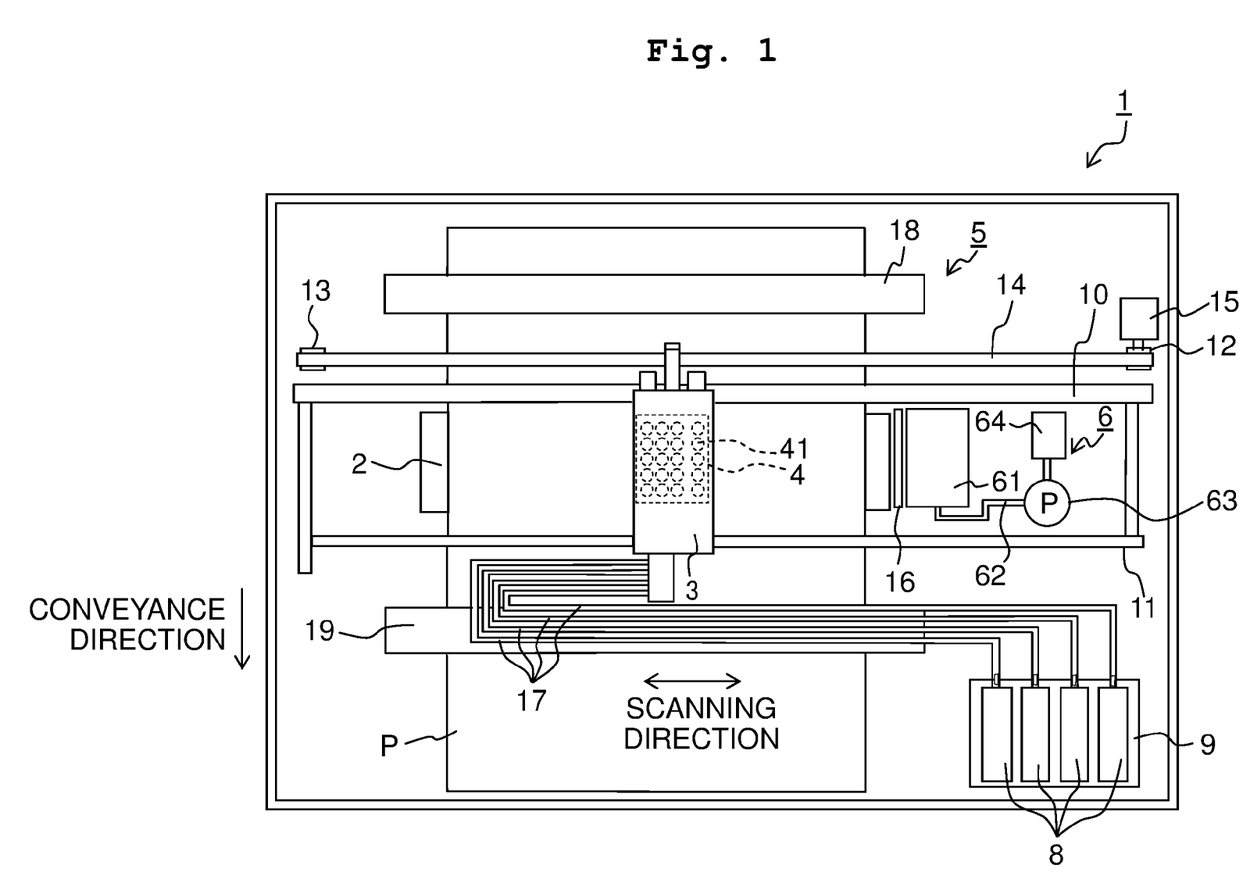
FIG. 1 is a schematic plan view depicting an exemplary configuration of an ink-jet recording apparatus of the present teaching.

FIG. 1 depicts an exemplary configuration of the ink-jet recording apparatus of the present teaching. As depicted in FIG. 1, an ink-jet recording apparatus 1 of the present teaching includes a platen 2, a carriage 3, an ink-jet head 4, a conveyance mechanism 5, and a maintenance unit 6 as main constitutive components or parts.

A recording medium P (e.g., recording paper) supplied from a feed mechanism (not depicted) is placed on the upper surface of the platen 2. Two guide rails 10, 11 extending in a scanning direction (a left-right direction in FIG. 1) are provided above the platen 2. The carriage 3 is reciprocatively movable in the scanning direction along the two guide rails 10, 11 in an area facing the platen 2.

The two guide rails 10, 11 extend in the scanning direction beyond the left and right ends of the platen 2. The carriage 3 is configured to be movable from the area facing the recording paper P on the platen 2 (recording area) to positions located away from the left and right ends of the platen 2 (non-recording areas). An endless belt 14 wound between two pulleys 12, 13 is connected to the carriage 3. The carriage 3 moves in the scanning direction according to the running of the endless belt 14 driven by a carriage drive motor 15.

The ink-jet head 4 is installed in a lower part of the carriage 3. The lower surface of the ink-jet head 4 is an ink jetting surface 4a (see FIG. 1) which is parallel to the upper surface of the platen 2 and in which nozzles 41 are open. Recording on the recording paper P is performed by jetting the ink(s) from the nozzles 41 of the ink jetting surface 4a to the recording paper P placed on the platen 2.

Four ink supply ports (not depicted in the drawings) respectively corresponding to black, yellow, cyan and magenta inks are provided on the upper surface of the ink-jet head 4, and first ends of four tubes 17 are connected to the four ink supply ports, respectively. Second ends of the four tubes 17 are connected to a cartridge installation section 9 to which four ink cartridges 8 respectively storing the above four inks are installed detachably. With this configuration, the above four inks are supplied to the ink-jet head 4 from the four ink cartridges 8 installed in the cartridge installation section 9 via the four tubes 17, respectively. Although this example uses a set with the four ink cartridges 8, instead of this, the present teaching may use an integrated type ink cartridge of which interior is comparted to form a black ink accommodating section, a yellow ink accommodating section, a magenta ink accommodating section, and a cyan ink accommodating section. As a body of the ink cartridge, for example, any conventionally known main body (body) of an ink cartridge can be used.

The conveyance mechanism 5 has two conveyance rollers 18, 19 which are disposed to sandwich the platen 2 therebetween in a conveyance direction (the direction from the top to the bottom of FIG. 1). The two conveyance rollers 18, 19 convey the recording paper P placed on the platen 2 in the conveyance direction.

The ink-jet recording apparatus 1 jets the ink from the ink-jet head 4 mounted on the carriage 3 to the recording paper P placed on the platen 2 and conveys the recording paper P in the conveyance direction by the two conveyance rollers 18 and 19, thereby recording a desired image, letter, or the like, on the recording paper P. According to the present teaching, it is possible to obtain a recorded matter in which the bleeding at a boundary between a black recording portion and each color recording portion is effectively prevented.

Next, the maintenance unit 6 will be explained. The maintenance unit 6 includes a waste liquid foam 64, a cap 61, a tube 62, and a pump 63 which are disposed on one side in the scanning direction (on the right side in FIG. 1) with respect to the platen 2. A wiper member 16, which is adjacent to the maintenance unit 6, is disposed closer to the platen 2 than the maintenance unit 6 in the scanning direction. The wiper member 16 is formed to have a spatula shape, and wipes the ink jetting surface 4a of the ink-jet head 4 according to the movement (reciprocating movement) of the carriage 3.

The cap 61 is driven by a cap drive mechanism (not depicted in the drawings) including a drive mechanism, such as a motor, to move in an up-down direction. Namely, the cap 61 moves closer to or away from the ink jetting surface 4a. A first end of the tube 62 is connected to the cap 61, and a second end of the tube 62 is connected to the pump 63. The suction cap 61 making contact with the ink jetting surface 4a covers the openings of the nozzles 41. Driving the pump 63 with the cap 61 being in a capping state and allowing the inside of the suction cap 61 to be subjected to suction and depressurization discharges inks from all of the nozzles 41 covered with the cap 61 (suction purge). Since the pump 63 is connected to the waste liquid foam 64, the inks sucked and discharged from the nozzles 16 through the suction purge are absorbed by the waste liquid foam 64 via the pump 63. Although not depicted in the drawings, the waste liquid foam 64 is accommodated in a box of which upper side is open. The waste liquid foam 64 may be any member, such as a foam body including melamine foam, provided that the member is capable of absorbing the inks. In the embodiment, the maintenance unit 6 is configured to suck the inks from the nozzles 41 using the pump 23. However, a so-called "push purge" may be adopted in which pressure is applied to the inks in the ink-jet head 4 to discharge the inks from the nozzles 41.

Figure 3:
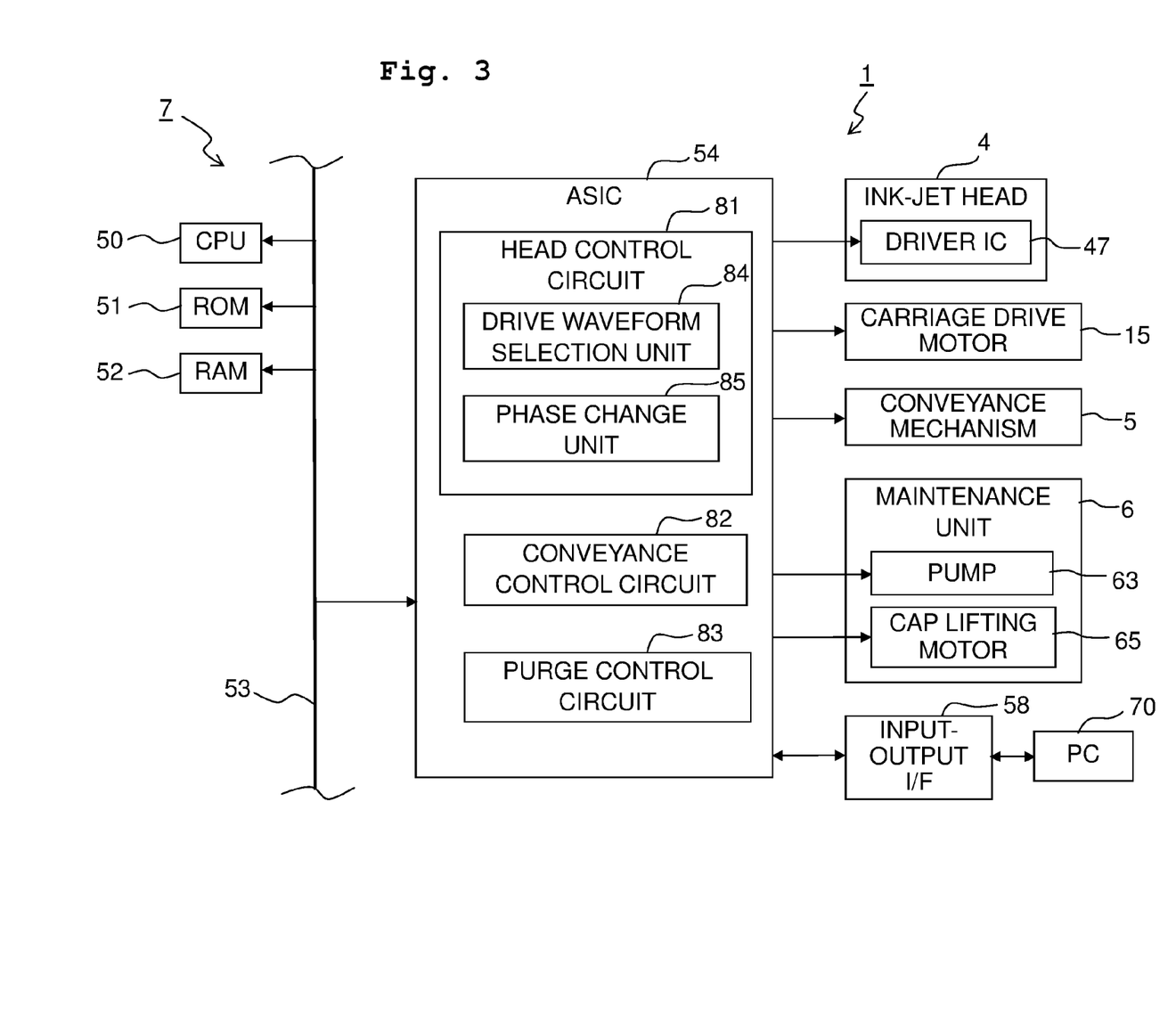
FIG. 3 is a block diagram depicting an exemplary electrical configuration of the ink-jet recording apparatus of the present teaching.

Subsequently, an explanation will be made about an exemplary electrical configuration of the ink-jet recording apparatus 1 with reference to the block diagram of FIG. 3. As depicted in FIG. 3, the ink-jet recording apparatus 1 of this example includes, as a control means, a microcomputer composed of a Central Processing Unit (CPU) 50, a Read Only Memory (ROM) 51, a Random Access Memory (RAM) 52, and a bus 53 connecting these components. The bas 53 is connected to an Application Specific Integrated Circuit (ASIC) 54 which controls a driver IC 47 of the ink-jet head 4, the carriage drive motor 15 driving the carriage 3, the conveyance mechanism 5, the pump 63 and a cap lifting motor 65 of the maintenance unit 6, and the like. The ASIC 54 is connected in data communication with a personal computer (PC) 70, which is an external device, via an input-output interface (I/F) 58.

Figure 2:
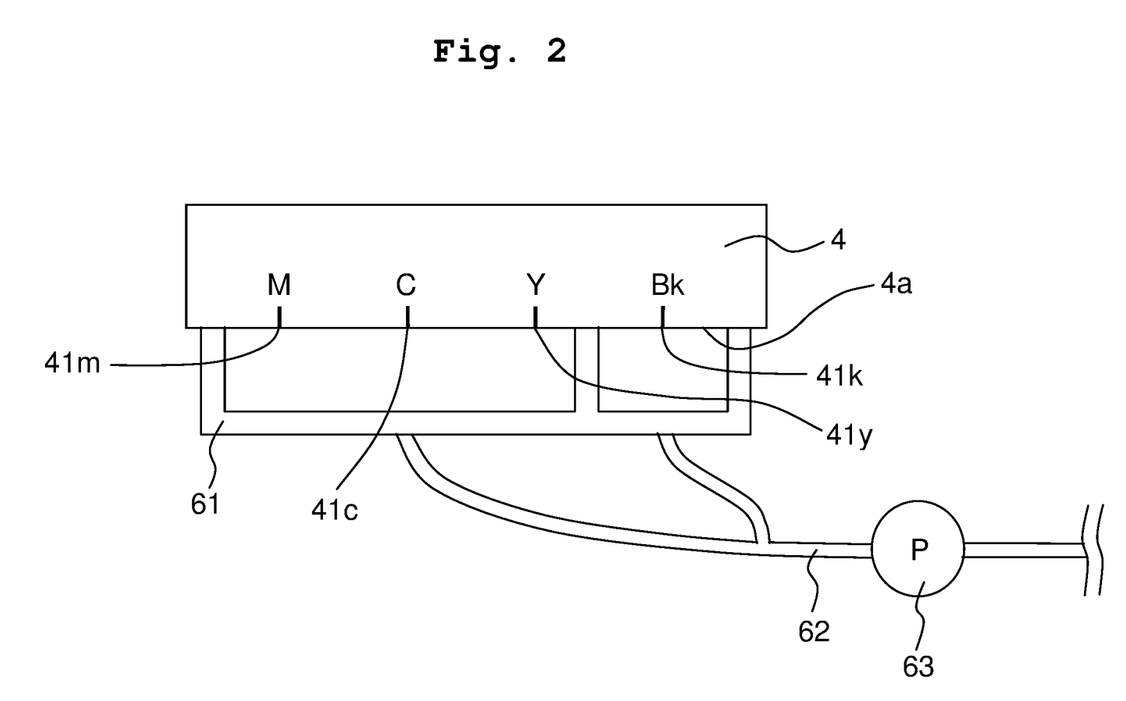
FIG. 2 schematically depicts an exemplary configuration of a maintenance unit in the ink-jet recording apparatus of the present teaching.

Next, an example of the maintenance unit 6 will be explained in more detail with reference to FIG. 2. FIG. 2 depicts an exemplary configuration of the maintenance unit 6 in which the cap 61 includes a partition dividing the inside of the cap 61 into two spaces, i.e., a space for a first nozzle row through which the water-based black ink is discharged and a space for a second nozzle row through which the water-based yellow, magenta, and cyan inks are discharged, and the tube 62 is configured as a combined channel in which the water-based black ink discharged from the first nozzle row and the water-based yellow, cyan, and magenta inks discharged from the second nozzle row run or flow together. In FIG. 2, a nozzle row 41k corresponds to the nozzle row for the water-based black ink, a nozzle row 41y corresponds to the nozzle row for the water-based yellow ink, a nozzle row 41c corresponds to the nozzle row for the water-based cyan ink, and a nozzle row 41m corresponds to the nozzle row for the water-based magenta ink. In the ink-jet head 4, the nozzle row for the water-based color ink having the highest electric conductivity (for example, the nozzle row 41m for the water-based magenta ink) may be formed at a position farthest from the nozzle row for the water-based black ink. The water-ink set of the present teaching is less likely to generate an aggregation or coagulation in the tube 62 when the water-based black ink makes contact with the water-based color inks of yellow, cyan, and magenta in the tube 62. Since the same drive source is used to perform the purge for the nozzle rows for the respective inks (black, yellow, cyan, and magenta inks) in this embodiment, the purge can be performed for the nozzle rows for the respective inks with approximately the same suction force. Further, the water-based ink set of the present teaching is less likely to generate an aggregation when the respective inks are mixed in equal amount in the tube 62. This effectively prevents the decrease in maintenability (the suction purge in this example). Furthermore, the water-based ink set of the present teaching is less likely to generate an aggregation when the water-based black ink makes contact with the water-based yellow, cyan, and magenta inks in the wiper member 16 (see FIG. 1) disposed adjacent to the maintenance unit 6. The structure of the maintenance unit 6 provided for the ink-jet recording apparatus of the present teaching is not limited to the example depicted in FIG. 2, and the maintenance unit 6 may be configured, for example, such that the cap 61 includes partitions dividing the inside of the cap 61 into four spaces, i.e., the spaces for respective nozzle rows for the water-based black, yellow, magenta, and cyan inks, or the cap 61 includes no partition.

The ink-jet recording method of the present teaching is an ink-jet recording method characterized by including: performing recording on a recording medium by discharging, to the recording medium, each water-based ink constituting a water-based ink set by an ink-jet system; and using the water-based ink set for ink-jet recording of the present teaching, as the water-based ink set. The recording includes printing a letter (text), printing an image, printing, and the like.

Subsequently, an explanation will be made about a method of selecting water-based inks for ink-jet recording according to the present teaching. The method of selecting water-based inks for ink-jet recording according to the present teaching is a method of selecting water-based inks for ink-jet recording constituting a water-based ink set for ink-jet recording, characterized in that: the water-based ink set includes the water-based black ink and water-based color inks of two or more colors; the water-based black ink contains the self-dispersible pigment, the low vapor pressure solvent, and water; the water-based color inks of two or more colors each contain a color pigment, the resin dispersant, the low vapor pressure solvent, and water; the average value of the blending amounts of the low vapor pressure solvents in all of the water-based inks constituting the water-based ink set is in the range of 15% by weight to 35% by weight; and the selecting method includes a measurement step of measuring the electrical conductivity of the water-based black ink, the electrical conductivity of the water-based color inks of two or more colors, and the electrical conductivity of a water-based ink prepared by mixing all of the water-based inks constituting the water-based ink set in equal amount and a selection step of selecting the water-based black ink and at least one of the water-based color inks of two or more colors to meet the condition X and the condition Y. In the method of selecting water-based inks for ink-jet recording according to the present teaching, since the electric conductivity of the water-based black ink, the electric conductivity of the water-based color inks of two or more colors, and the electric conductivity of the water-based ink prepared by mixing all of the water-based inks constituting the water-based ink set in equal amount are measured and the water-based black ink and at least one of the water-based color inks of two or more colors are selected to meet the condition X and the condition Y, the water-based black ink and at least one of the water-based color inks of two or more colors are selected very easily so that they are less likely to cause the bleeding at a boundary between a black recording portion and each color recording portion and to generate an aggregation or coagulation during maintenance. Any other conditions for the method of selecting water-based inks for ink-jet recording according to the present teaching are the same as those for the water-based ink set for ink-jet recording of the present teaching.

Subsequently, an explanation will be made about a method of producing the water-based ink set for ink-jet recording according to the present teaching. The method of producing the water-based ink set for ink-jet recording according to the present teaching is a method of producing a water-based ink set for ink-jet recording including the water-based black ink and water-based color inks of two or more colors, characterized in that the water-based black ink and at least one of the water-based color inks of two or more colors are selected beforehand to meet the condition X and the condition Y by the method of selecting water-based inks for ink-jet recording according to the present teaching, and on the basis of the selection, a combination of the water-based black ink and at least one of the water-based color inks of two or more colors is determined. In the method of producing the water-based ink set for ink-jet recording according to the present teaching, since the water-based black ink and at least one of the water-based color inks of two or more colors are selected beforehand in accordance with the method for selecting water-based inks for ink-jet recording according to the present teaching, it is possible to obtain the water-based ink set for ink-jet recording, which is less likely to cause the bleeding at a boundary between a black recording portion and each color recording portion and to generate an aggregation or coagulation during maintenance, very easily. Any other conditions for the method of producing the water-based ink set for ink-jet recording according to the present teaching are the same as those for the water-based ink set for ink-jet recording according to the present teaching.

Next, an explanation will be made about a method of preventing bleeding according to the present teaching. The method of preventing bleeding according to the present teaching is a method of preventing bleeding in ink-jet recording in which a water-based ink set is used, characterized in that the water-based ink set is the water-based ink set for ink-jet recording of the present teaching.

EXAMPLES

Next, examples of the present teaching will be explained together with comparative examples. Note that the present teaching is not limited and is not restricted to the examples and the comparative examples which will be described below.

<Preparation of Carbon Black Water Dispersion Liquid>

40 g of carbon black ("#2650" produced by Mitsubishi Chemical Corporation) was mixed with 200 g of ion-exchanged water, and the mixture was pulverized by use of a bead mill. A carboxylating agent was added to the crushed mixture. The mixture, to which the carboxylating agent was added, was heated and stirred, and then oxidatively-treated. Next, the solution (liquid) obtained as described above was washed or cleaned with a solvent several times, after that, the solution was poured into water. After washed with water several times, the solution was filtrated or filtered through a filter, thereby obtaining a carbon black water dispersion liquid.

<Preparation of Water-Based Black Ink>

Components, except for the carbon black water dispersion liquid, which were included in Water-based ink composition (TABLE 1) were mixed uniformly or homogeneously, thereby obtaining an ink solvent. Subsequently, the ink solvent was added to the carbon black water dispersion liquid, followed by being mixed uniformly. After that, the obtained mixture was filtrated by using a cellulose acetate membrane filter (pore size: 3.00 µm) produced by Toyo Roshi Kaisha, Ltd., and thus each of the water-based inks Bk1 to Bk7 indicated in TABLE 1 was obtained.

Table 1 (Following)—Legend

*1: Acetylenic glycol-based surfactant; produced by Nissin Chemical Industry Co., Ltd.

*2: Acetylenic glycol-based surfactant; produced by Nissin Chemical Industry Co., Ltd.

*3: Surfactant; produced by LION SPECIALITY CHEMICALS CO., LTD.

*4: Surfactant; produced by Kao Corporation

*5: Surfactant; produced by Kao Corporation

*6: Resin; produced by BASF Corporation

Regarding numerals in TABLE 1, those of the carbon black water dispersion liquid and the resin indicate solid content amounts and those of the surfactants indicate active ingredients.

TABLE 1

| | | Bk1 | Bk2 | Bk3 | Bk4 | Bk5 | Bk6 | Bk7 |
|---|---|---|---|---|---|---|---|---|
| Water-ink Composition (% by weight) | Carbon black water dispersion liquid | 7 | 8 | 5 | 9 | 7 | 5 | 10 |

| | | Vapor pressure (Pa, 20° C.) | | | | | | | |
|---|---|---|---|---|---|---|---|---|---|
| | Glycerol | <1 | 16 | 22 | 10 | 10 | 6 | 26 | 22 |
| | Polyethylene glycol 200 | <1 | 6 | — | 5 | — | 2 | 5 | — |
| | Triethylene glycol | <1 | — | — | 5 | 3 | — | 5 | — |
| | Tripropylene glycol | <1 | — | — | 5 | — | 3 | — | — |
| | 1,2,6-hexanetriol | <1 | — | — | — | 1 | — | — | — |
| | Diethylene glycol | 2.7 | — | 3 | — | — | — | — | — |
| | 1,2-hexanediol | 2.5 | — | — | 3 | — | 10 | — | — |
| | Triethylene glycol-n-butyl ether | 3 | 3 | 3 | 3 | 3 | 3 | 3 | 3 |
| | OLFIN (trade name) E1010 (*1) | 0.2 | 0.2 | 0.2 | 0.2 | 0.2 | 0.2 | 0.2 | 0.2 |
| | OLFIN (trade name) E1004 (*2) | 0.3 | 0.3 | 0.3 | 0.3 | 0.3 | 0.3 | 0.3 | 0.3 |
| | SUNNOL (trade name) NL1430 (*3) | 0.2 | 0.7 | — | 1 | — | — | 0.2 | 1 |
| | ENAL (trade name) 0 (*4) | — | — | — | — | — | 0.2 | — | 1 |
| | NEOPELEX (trade name) G-15 (*5) | — | — | 0.2 | 1 | — | — | — | — |
| | JOHNCRYL (trade name) 61 (*6) | 0.2 | 0.3 | 0.2 | 0.2 | 0.2 | 0.2 | 0.2 | 0.2 |
| | Water | balance | balance | balance | balance | balance | balance | balance |
| Blending amount of low vapor pressure solvent (% by weight) | | 22 | 22 | 25 | 14 | 11 | 36 | 22 |
| Electric conductivity (mS/m) | | 0.7 | 0.8 | 0.6 | 1.1 | 0.7 | 0.5 | 1.3 |

[Preparation of Pigment Dispersion Liquid]

Purified water was added to 20% by weight of a pigment (C.I. pigment yellow 74, C.I. pigment red 122, or C.I. pigment blue 15:3) and 7% by weight of a sodium hydroxide neutralized product of a styrene-acrylic acid copolymer (acid value 175, molecular weight 10,000), so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). Each of the yellow pigment dispersion liquid, the magenta pigment dispersion liquid, and the cyan pigment dispersion liquid indicated in TABLE 2 was obtained, accordingly.

[Preparation of Water-Based Color Ink]

Components, except for each of the pigment dispersion liquids, which were included in Water-based ink composition (TABLE 2) were mixed uniformly or homogeneously, thereby obtaining an ink solvent. Subsequently, the ink solvent was added to each of the pigment dispersion liquids, followed by being mixed uniformly. After that, the obtained mixture was filtrated by using a cellulose acetate membrane filter (pore size: 3.00 μm) produced by Toyo Roshi Kaisha, Ltd., and thus each of the water-based yellow inks Y1 to Y5, the water-based magenta inks M1 to M5, and the water-based cyan inks C1 to C5 indicated in TABLE 2 was obtained.

Table 2 (Following)—Legend
*1: Acetylenic glycol-based surfactant; produced by Nissin Chemical Industry Co., Ltd.
*2: Acetylenic glycol-based surfactant; produced by Nissin Chemical Industry Co., Ltd.
*3: Surfactant; produced by LION SPECIALITY CHEMICALS CO., LTD.
*4: Surfactant; produced by Kao Corporation
*5: Surfactant; produced by Kao Corporation
*7: Resin; produced by BASF Corporation
*8: Resin; produced by BASF Corporation
Regarding numerals in TABLE 2, those of the pigment dispersion liquids and the resins indicate solid content amounts and those of the surfactants indicate active ingredients.

TABLE 2

| | | Y1 | Y2 | Y3 | Y4 | Y5 | M1 | M2 | M3 | M4 | M5 |
|---|---|---|---|---|---|---|---|---|---|---|---|
| Water-ink Composition (% by weight) | Yellow pigment dispersion liquid | 4.5 | 4.5 | 4 | 6 | 3.5 | — | — | — | — | — |
| | Magenta pigment dispersion liquid | — | — | — | — | — | 5.5 | 6 | 4.5 | 6.5 | 4 |
| | Cyan pigment dispersion liquid | — | — | — | — | — | — | — | — | — | — |

| | | Vapor pressure (Pa, 20° C.) | | | | | | | | | | |
|---|---|---|---|---|---|---|---|---|---|---|---|---|
| | Glycerol | <1 | 20 | 10 | 30 | 15 | 30 | 17 | 12 | 20 | 10 | 30 |
| | Polyethylene glycol 200 | <1 | 4 | — | — | — | — | — | — | — | — | — |
| | Triethylene glycol | <1 | — | 10 | — | — | 6 | 5 | — | 4 | 4 | 6 |

TABLE 2-continued

| | Vapor pressure (Pa, 20° C.) | | | | | | | | | | |
|---|---|---|---|---|---|---|---|---|---|---|---|
| Tripropylene glycol | <1 | — | — | 4 | — | — | — | 6 | — | — | — |
| Diethylene glycol | 2.7 | — | — | — | — | — | — | 2 | 3 | — | — |
| 1,2-hexanediol | 2.5 | — | 2 | 2 | 3 | — | — | — | — | 3 | — |
| Triethylene glycol-n-butyl ether | | 3 | 3 | 3 | 3 | 3 | 3 | 3 | 3 | 3 | 3 |
| OLFIN (trade name) E1010 (*1) | | 0.2 | 0.2 | 0.2 | 0.2 | 0.2 | 0.2 | 0.2 | 0.2 | 0.2 | 0.2 |
| OLFIN (trade name) E1004 (*2) | | 0.5 | 0.5 | 0.5 | 0.5 | 0.5 | 0.3 | 0.3 | 0.3 | 0.3 | 0.3 |
| SUNNOL (trade name) NL1430 (*3) | | 0.5 | — | 0.3 | 0.3 | — | — | 1 | 0.6 | 0.7 | — |
| ENAL (trade name) 0 (*4) | | — | — | — | — | — | 0.5 | — | — | — | — |
| NEOPELEX (trade name) G-15 (*5) | | — | 0.5 | 0.3 | — | 1 | — | — | — | 0.5 | 1 |
| Triethanolamine | | 0.1 | 0.1 | 0.1 | 0.1 | 0.1 | 0.1 | 0.1 | 0.1 | 0.1 | 0.1 |
| JOHNCRYL (trade name) 61J (*7) | | 0.2 | — | — | — | 0.5 | 0.5 | 1 | — | 1 | 0.5 |
| JOHNCRYL (trade name) JDX6500 (*8) | | — | 0.4 | 0.5 | 0.3 | — | — | — | 0.7 | — | — |
| Water | | balance | balance | balance | balance | balance | balance | balance | balance | balance | balance |
| Blending amount of low vapor pressure solvent (% by weight) | | 24 | 20 | 34 | 15 | 37 | 22 | 18 | 24 | 14 | 37 |
| Electric conductivity (mS/m) | | 1.3 | 1.3 | 1.2 | 1.5 | 1.1 | 1.6 | 1.9 | 1.4 | 2.1 | 1.3 |

| | | C1 | C2 | C3 | C4 | C5 |
|---|---|---|---|---|---|---|
| Water-ink Composition (% by weight) | Yellow pigment dispersion liquid | — | — | — | — | — |
| | Magenta pigment dispersion liquid | — | — | — | — | — |
| | Cyan pigment dispersion liquid | 4 | 4.5 | 3 | 3.5 | 2.5 |

| | Vapor pressure (Pa, 20° C.) | | | | | |
|---|---|---|---|---|---|---|
| Glycerol | <1 | 23 | 16 | 20 | 19 | 30 |
| Polyethylene glycol 200 | <1 | — | 6 | 5 | — | — |
| Triethylene glycol | <1 | — | — | 5 | — | 10 |
| Tripropylene glycol | <1 | 6 | — | 5 | — | — |
| Diethylene glycol | 2.7 | — | — | — | 10 | — |
| 1,2-hexanediol | 2.5 | — | — | 6 | 3 | — |
| Triethylene glycol-n-butyl ether | | 3 | 3 | 3 | 3 | 3 |
| OLFIN (trade name) E1010 (*1) | | 0.2 | 0.2 | 0.2 | 0.2 | 0.2 |
| OLFIN (trade name) E1004 (*2) | | 0.3 | 0.3 | 0.3 | 0.3 | 0.3 |
| SUNNOL (trade name) NL1430 (*3) | | — | — | — | — | — |
| ENAL (trade name) 0 (*4) | | — | — | — | — | — |
| NEOPELEX (trade name) G-15 (*5) | | 0.5 | 1 | 0.6 | 1 | 1 |
| Triethanolamine | | 0.1 | 0.1 | 0.1 | 0.1 | 0.1 |
| JOHNCRYL (trade name) 61J (*7) | | 0.4 | 0.6 | — | — | — |
| JOHNCRYL (trade name) JDX6500 (*8) | | — | — | 0.5 | 0.5 | 0.3 |
| Water | | balance | balance | balance | balance | balance |
| Blending amount of low vapor pressure solvent (% by weight) | | 29 | 22 | 35 | 19 | 40 |
| Electric conductivity (mS/m) | | 1.3 | 1.4 | 1.1 | 1.2 | 0.9 |

Examples 1 to 5 and Comparative Examples 1 to 3

Composition of Water-Based Ink Set for Ink-Jet Recording

As indicated in TABLE 3, water-based ink sets for ink-jet recording were each obtained by combining one of the water-based black inks Bk1 to Bk7, one of the water-based yellow inks Y1 to Y5, one of the water-based magenta inks M1 to M5, and one of the water-based cyan inks C1 to C5.

Regarding the water-based ink sets of Examples 1 to 5 and Comparative Examples 1 to 3, (a) pump endurance evaluation, (b) nozzle clogging evaluation, and (c) bleeding evaluation were performed by the following methods.

(a) Pump Endurance Evaluation

An ink-jet printer "DCP-J4225N" manufactured by BROTHER KOGYO KABUSHIKI KAISHA was used to perform continuous suction purges 1,000 times at room temperature by using the water-based black ink, the water-based yellow ink, the water-based magenta ink, and the water-based cyan ink constituting the water-based ink set of each of Examples 1 to 5 and Comparative Examples 1 to 3, and the durability of the pump was evaluated in accordance with the following criteria.

<Evaluation Criteria for Pump Endurance Evaluation>

A: In the continuous suction purges carried out 1,000 times, the amount of suction per one time was in a prescribed amount, that is, in the range of 0.26 to 0.30 mL.

B: In the continuous suction purges carried out 1,000 times, the amount of suction per one time was less than a lower limit of the prescribed amount, that is, less than 0.26 mL. However, in continuous suction purges carried out 300 times, the amount of suction per one time was in the prescribed amount, that is, in the range of 0.26 to 0.30 mL.

C: In the continuous suction purges carried out 300 times, the amount of suction per one time was less than the lower limit of the prescribed amount, that is, less than 0.26 mL.

(b) Nozzle Clogging Evaluation

The ink-jet printer "DCP-J4225N" was used to perform continuous wiping for the ink jetting surface of the ink-jet head 1,000 times at room temperature by using the water-based black ink, the water-based yellow ink, the water-based magenta ink, and the water-based cyan ink constituting the water-based ink set of each of Examples 1 to 5 and Comparative Examples 1 to 3, and nozzle clogging was evaluated in accordance with the following criteria. The term "non-discharge" indicates such a state that each nozzle of the ink-jet head is clogged and no ink is discharged from each nozzle; and the term "discharge-bending (discharge-deflection)" indicates such a state that a part of the nozzle of the ink-jet head is clogged, and the water-based ink is not discharged perpendicularly to a recording paper, namely, it is discharged obliquely with respect to the recording paper. In the ink-jet head of the ink-jet printer "DCP-J4225N", the nozzle rows for the water-based black ink and the nozzle rows for the water-based color inks are disposed close to each other. Thus, when all of the nozzle rows formed in the ink-jetting surface are collectively wiped in a lateral direction, the water-based black ink makes contact with the water-based color inks.

<Evaluation Criteria for Nozzle Clogging Evaluation>

AA: Neither non-discharge nor discharge-bending occurred after the continuous wiping for the ink-jetting surface carried out 1,000 times.

A: At least one of non-discharge and discharge-bending slightly occurred after the continuous wiping for the ink-jetting surface carried out 1,000 times, but ink-jetting performance was recovered by the purge(s) carried out three times or less.

B: At least one of non-discharge and discharge-bending slightly occurred after the continuous wiping for the ink-jetting surface carried out 1,000 times, but ink-jetting performance was recovered by the purge(s) carried out ten times or less.

C: Non-discharge and discharge-bending occurred many times after the continuous wiping for the ink-jetting surface carried out 1,000 times, and both of the non-discharge and the discharge-bending failed to recover in a short time.

(c) Bleeding Evaluation

The ink-jet printer "DCP-J4225N" was used to form two red portions which are mixed color portions using the water-based yellow ink and the water-based magenta ink, two green portions which are mixed color portions using the water-based yellow ink and the water-based cyan ink, and two blue portions which are mixed color portions using the water-based magenta ink and the water-based cyan ink, on three types of regular paper ("Rey Copy paper" manufactured by International Paper, "Business" and "Recycled Supreme" manufactured by XEROX), wherein the water-based yellow, magenta, and cyan inks constitute the water-based ink set of each of Examples 1 to 5 and Comparative Examples 1 to 3. Then, a black line using the water-based black ink that constitutes the water-based ink set of each of Examples 1 to 5 and Comparative Examples 1 to 3 was formed in the two red portions, two green portions, and two blue portions. Evaluation samples were prepared, accordingly. Regarding the bleeding in each evaluation sample, Raggedness was measured by a handheld image analysis system "PIAS (trade name)-II" manufactured by Quality Engineering Associates Inc. (QEA) and the evaluation was performed according to the following evaluation criteria. The measurement of the Raggedness was performed three times per each regular paper in conformity with ISO-13660. Here, the measurement result of each regular paper was obtained such that an average value of values obtained by three measurements was rounded off all fractions. Further, "an average (Raggedness) of the three types of regular paper" described in the following criteria for bleeding evaluation was obtained as follows. That is, the respective average values of the three types of regular paper (values before being rounded) were summed up; the summed value was divided three to obtain an average value of the measurement results of the three types of regular paper; and the average value was rounded off all fractions.

<Evaluation Criteria for Bleeding Evaluation>

A: Average Raggedness of the water-based black ink lines in the three types of regular paper was less than 27 μm, the water-based black ink lines being formed in the mixed color portions using the water-based color ink with the highest electric conductivity and the water-based color ink with the second highest electric conductivity.

B: Average Raggedness of the water-based black ink lines in the three types of regular paper was 27 μm or more and less than 32 μm, the water-based black ink lines being formed in the mixed color portions using the water-based color ink with the highest electric conductivity and the water-based color ink with the second highest electric conductivity.

C: Average Raggedness of the water-based black ink lines in the three types of regular paper was 32 μm or more, the water-based black ink lines being formed in the mixed color portions using the water-based color ink with the highest electric conductivity and the water-based color ink with the second highest electric conductivity.

TABLE 3 shows the compositions and the evaluation results for the water-based ink sets of Examples 1 to 5 and Comparative Examples 1 to 3.

TABLE 3

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Water-based black ink | Bk1 | Bk2 | Bk3 | Bk4 | Bk3 | Bk5 | Bk6 | Bk7 |
| Electrical conductivity (mS/m) | 0.7 | 0.8 | 0.6 | 1.1 | 0.6 | 0.7 | 0.5 | 1.3 |
| Water-based yellow ink | Y1 | Y2 | Y3 | Y4 | Y5 | Y4 | Y5 | Y4 |
| Electrical conductivity (mS/m) | 1.3 | 1.3 | 1.2 | 1.5 | 1.1 | 1.5 | 1.1 | 1.5 |
| Water-based magenta ink | M1 | M2 | M3 | M4 | M5 | M4 | M5 | M4 |
| Electrical conductivity (mS/m) | 1.6 | 1.9 | 1.4 | 2.1 | 1.3 | 2.1 | 1.3 | 2.1 |
| Water-based cyan ink | C1 | C2 | C3 | C4 | C5 | C4 | C5 | C4 |
| Electrical conductivity (mS/m) | 1.3 | 1.4 | 1.1 | 1.2 | 0.9 | 1.2 | 0.9 | 1.2 |
| Average blending amount of low vapor pressure solvent (% by weight) | 24.25 | 20.50 | 29.50 | 15.50 | 34.75 | 14.75 | 37.50 | 17.50 |
| C-K | 0.75 | 0.85 | 0.70 | 0.70 | 0.60 | 1.1 | 0.70 | 0.50 |
| A | 1.23 | 1.35 | 1.08 | 1.48 | 0.98 | 1.38 | 0.95 | 1.53 |
| Pump endurance | A | A | A | B | B | C | C | C |
| Nozzle clogging | AA | A | AA | B | AA | B | AA | C |
| Bleeding | A | A | A | A | B | A | A | C |

As indicated in TABLE 3, Examples 1 to 5 had good evaluation results of pump endurance, nozzle clogging, and bleeding. In particular, Examples 1 to 3 in which the average value of the blending amounts of the low vapor pressure solvents in all of the water-based inks constituting each of the water-based ink sets was in the range of 20% by weight to 30% by weight, had very good evaluation results of pump endurance, nozzle clogging, and bleeding. Examples 2 and 4 in which the pigment solid content amounts in the water-based black ink and the water-based color inks were high, had high optical concentration (high OD values). Meanwhile, Comparative Examples 1 and 2 in which the average value of the blending amounts of the low vapor pressure solvents in all of the water-based inks constituting each of the water-based ink sets was less than 15% by weight or 35% by weight or more, had bad evaluation results of pump endurance. Comparative Example 3 in which the condition (Y), A≤1.5, was not satisfied, had bad evaluation results of pump endurance, nozzle clogging, and bleeding.

As described above, the water-based ink set of the present teaching is less likely to cause the bleeding at a boundary between a black recording portion and each color recording portion and to generate an aggregation or coagulation during maintenance. The way of use of the water-based ink set of the present teaching is not particularly limited, and the water-based ink set is widely applicable to various types of ink-jet recording.

What is claimed is:

1. A water-based ink set for ink-jet recording, comprising:
   a water-based black ink containing a self-dispersible pigment, a water-soluble organic solvent of which vapor pressure is less than 1 Pa, and water;
   water-based color inks of two or more colors each containing a color pigment, a resin dispersant, a water-soluble organic solvent of which vapor pressure is less than 1 Pa, and water;
   wherein an average value of blending amounts of the water-soluble organic solvents in the water-based black ink and the water-based color inks of two or more colors constituting the water-based ink set is in a range of 15% by weight to 35% by weight, and
   the water-based ink set satisfies the following condition X and condition Y,
   condition X: C−K≥0.6
   C: an average value (mS/m) of a total of a highest electric conductivity of the water-based color inks of two or more colors, if the water-based color inks of two or more colors each have the highest electric conductivity, or an average value (mS/m) of a highest electric conductivity and a second highest electric conductivity of the water-based color inks of two or more colors, if the water-based color inks of two or more colors have the single highest electric conductivity
   K: an electric conductivity (mS/m) of the water-based black ink, and
   condition Y: A≤1.5
   A: an electric conductivity (mS/m) of a water-based ink prepared by mixing all of the water-based black ink and the water-based color inks of two or more colors constituting the water-based ink set in equal amount.

2. The water-based ink set for ink-jet recording according to claim 1, wherein the average value of the blending amounts of the water-soluble organic solvents in the water-based black ink and the water-based color inks of two or more colors constituting the water-based ink set is in a range of 20% by weight to 30% by weight.

3. The water-based ink set for ink-jet recording according to claim 1, wherein the water-based ink set satisfies C−K≥0.7 and A≤1.35.

4. The water-based ink set for ink-jet recording according to claim 1, wherein the water-based color inks of two or more colors includes a water-based magenta ink, and
   of electric conductivity of the water-based color inks of two or more colors, the water-based magenta ink has a highest electric conductivity.

5. The water-based ink set for ink-jet recording according to claim 4, wherein the water-based color inks of two or more colors includes a water-based magenta pigment ink, a water-based cyan pigment ink, and a water-based yellow pigment ink,
   an electric conductivity of the water-based black ink is lower than an electric conductivity of one of the water-based color inks of two or more colors which has the lowest electric conductivity among the water-based magenta pigment ink, the water-based cyan pigment ink, and the water-based yellow pigment ink.

6. The water-based ink set for ink-jet recording according to claim 1, wherein the water-based ink set satisfies A≤1.25.

7. The water-based ink set for ink-jet recording according to claim 1, wherein the water-based ink set satisfies 0.6≤C−K≤0.9 and 1.0≤A≤1.5.

8. The water-based ink set for ink-jet recording according to claim 1, wherein the water-based black ink contains a self-dispersible carbon black, the water-soluble organic solvent of which vapor pressure is less than 1 Pa, a surfactant, and water,
   the water-based color inks of two or more colors include:
   a water-based yellow ink containing a yellow pigment, the resin dispersant, the water-soluble organic solvent of which vapor pressure is less than 1 Pa, a surfactant, and water;
   a water-based magenta ink containing a magenta pigment, the resin dispersant, the water-soluble organic solvent of which vapor pressure is less than 1 Pa, a surfactant, and water; and
   a water-based cyan ink containing a cyan pigment, the resin dispersant, the water-soluble organic solvent of which vapor pressure is less than 1 Pa, a surfactant, and water.

9. The water-based ink set for ink-jet recording according to claim 8, wherein, of electric conductivity of the water-based black ink and the water-based color inks of two or more colors constituting the water-based ink set, the water-based magenta ink has a highest electric conductivity and the water-based black ink has a smallest electric conductivity.

10. The water-based ink set for ink-jet recording according to claim 8, wherein the water-soluble organic solvents include glycerol and the surfactants include an acetylenic glycol-based surfactant.

11. An ink-jet recording apparatus, comprising:
    ink accommodating sections;
    an ink-jet head including rows of nozzles from which inks contained in the ink accommodating sections are jetted respectively; and
    a maintenance unit configured to discharge the inks from the nozzles of the ink-jet head,
    wherein the ink accommodating sections contain the water-based black ink and the water-based color inks of two or more colors constituting the water-based ink set for ink-jet recording as defined in claim 1.

12. The ink-jet recording apparatus according to claim 11, wherein the maintenance unit includes a cap, a tube, and a pump,

- the cap is configured to move closer to or away from the ink-jet head and to cover a first nozzle row from which the water-based black ink is discharged and a second nozzle row from which the water-based color inks are discharged with the cap making contact with the ink-jet head,
- a first end of the tube is connected to the cap and a second end of the tube is connected to the pump, and
- the tube includes a combined channel in which the water-based black ink discharged from the first nozzle row and the water-based color inks discharged from the second nozzle row run or flow together.

13. The ink-jet recording apparatus according to claim 12, wherein the cap includes partitions which divide an interior or inside of the cap into a first space communicating with the first nozzle row and a second space communicating with the second nozzle row, with the cap making contact with the ink-jet head.

* * * * *